(12) United States Patent
Kmicikiewicz

(10) Patent No.: US 6,852,055 B2
(45) Date of Patent: Feb. 8, 2005

(54) CONTINUOUSLY VARIABLE POWER SPLIT TRANSMISSION (CVPST) SYSTEM FOR USE IN A HYBRID VEHICLE

(75) Inventor: Marek Kmicikiewicz, Montreal (CA)

(73) Assignee: CKE Technologies Inc., Quebec (CA)

( * ) Notice: Subject to any disclaimer, the term of this patent is extended or adjusted under 35 U.S.C. 154(b) by 0 days.

(21) Appl. No.: 10/696,678

(22) Filed: Oct. 29, 2003

(65) Prior Publication Data

US 2004/0087407 A1 May 6, 2004

Related U.S. Application Data

(63) Continuation of application No. 10/326,446, filed on Dec. 19, 2002, now abandoned, which is a continuation of application No. 09/865,764, filed on May 25, 2001, now abandoned.

(30) Foreign Application Priority Data

May 26, 2000 (CA) .............................................. 2309759

(51) Int. Cl.[7] .................................................. F16H 3/72
(52) U.S. Cl. ............................ 475/5; 475/151; 475/211; 475/218
(58) Field of Search ............................ 475/5, 151, 152, 475/211, 210, 212, 213, 218

(56) References Cited

U.S. PATENT DOCUMENTS 3,225,732 A * 12/1965 Carlsen ................... 475/152 X
4,233,858 A * 11/1980 Rowlett ......................... 475/5
4,913,003 A    4/1990 Tervola
4,990,127 A    2/1991 Roberts, deceased et al.
5,167,591 A   12/1992 Cowan
5,720,686 A *  2/1998 Yan et al. .................... 475/211
5,827,146 A   10/1998 Yan et al.

FOREIGN PATENT DOCUMENTS

EP    0 061 575    10/1982
GB    2 086 496 A   5/1982
JP    57-107462   *  7/1982   ............. 475/152 X

* cited by examiner

*Primary Examiner*—Ha Ho
(74) *Attorney, Agent, or Firm*—Akerman Senterfitt

(57) ABSTRACT

A continuously variable power split transmission (CVPST) system is described for use in a hybrid vehicle. The vehicle has a first motor, such as an internal combustion (IC) engine and a second motor, such as an electric motor. The system has a step-up gearbox for providing additional fixed speed ratios to extend overall transmission conversion range (CR) of the system. The system also has a speed variator and a countershaft being operatively connected to the second motor of the vehicle so that any power input applied by the second motor to the countershaft reduces the power flowing through the speed variator. Also, an adjustment of the variator speed ratio $i_v$ allows a passage from underdrive $i_{UD}$ to overdrive $i_{OD}$ range of speed ratios in the step-up gearbox to be synchronized.

10 Claims, 3 Drawing Sheets

CONTINUOUSLY VARIABLE POWER SPLIT TRANSMISSION (CVPST) SYSTEM FOR USE IN A HYBRID VEHICLE

CROSS-REFERENCE TO RELATED APPLICATIONS

This is a continuation of U.S. patent application Ser. No. 10/326,446 filed Dec. 19, 2002, now abandoned, which is a continuation of U.S. patent application Ser. No. 09/865,764 filed May 25, 2001, now abandoned.

FIELD OF THE INVENTION

The present invention is concerned with a continuously variable power split transmission system (CVPST) for use in a hybrid vehicle, in particular in a vehicle having a first motor power supply and a second motor power supply.

BACKGROUND ART

Conventional continuously variable transmission (CVT) systems are well known. CVT applications rely on shaft-to-shaft power transmission in their operation. The problem with CVT systems is that, at high-speed modes of operation, the pulley-belt action limits the capacity of the systems, as the belt tends to jitter due to slippage. Furthermore, CVT losses are greatest at low speeds and at overdrive, and reduced to a minimum when the velocity ratio i.sub.v is about 1.00.

To solve this problem which is quite important in automotive applications, it has already been suggested to use a continuously variable power split transmission (CVPST) system such as in U.S. Pat. No. 5,167,591 by COWAN. Such a system is actually a variable pulley system (or "variator") coupling two of the three rotating elements of a planetary gear train. A main feature of such a system is that it carries only a fraction of the total power flowing through the variator, thus increasing the power envelope of the potential engine application. This feature also reduces the power losses associated with power transmission, especially at the low-speed-high-torque modes, while providing continuously variable transmission ratio capability. Thus, as it can be understood, CVPST systems accomplish two important functions, which are desirable in any automotive application.

First of all, at low speeds, only a fraction of the power flows through the variator thereby increasing the power envelope of the application while reducing the losses by the same factor.

Secondly, the system provides a "stepless" transmission ratio variation. This, combined with appropriate engine throttle control (motorized throttle), allows for optimum engine performance and minimum fuel consumption and emissions.

SUMMARY OF INVENTION

It has now been discovered, and this is the object of the present invention, that if one supplies power from, for example, an electric motor to the control element (countershaft) of a CVPST in an automotive vehicle, one may further reduce the power flowing through the variator. This power or excess of torque can be used entirely to overcome the acceleration resistance power of the vehicle, so that even during the transient conditions such as acceleration, the working point of the internal combustion (IC) engine is kept all the time on the Optimum Efficiency Curve.

Thus, use of a CVPST in a hybrid vehicle comprising an IC engine and an electric motor connected to the countershaft of the CVPST allows for further power split and therefore an increase of efficiency and power envelope.

Use of only electric power for acceleration allows the working point of the IC engine to stay all the time on the Optimum Efficiency Curve (OEC), even during the transient conditions of the acceleration process. Incremental and simultaneous adjustment of the opening of the throttle (rack position in Diesels) and the ratio of the CVPST can achieve this result. Due to these adjustments, while vehicle accelerates with the excess of torque from electric motor (supplied through the countershaft), the intersection point of the Opening of the Throttle (OT) curve of the IC engine and Driving Resistance Curve (DRC) of the vehicle, can follow the Optimum Efficiency/Emission Curve (OEC).

In other words, further unloading of the variator belt is possible with use of electric power (torque) applied to the countershaft of the CVPST. Advantageously, a start-up clutch, or first clutch, may be provided on the countershaft to allow the variator to rotate with the engine, even when the clutch is disengaged and vehicle is not moving. This prevents the transmission to be stuck in the high gear (stalling of the engine during a panic braking on the slippery surfaces). After restarting of the engine, the variator turns, and it is possible to bring it back to low gear ratio position.

In use, the CVPST can be connected to the transmission of the vehicle as is disclosed in U.S. Pat. No. 5,167,591. However, to avoid negative circulation power, use will preferably be made of an idler gear to ensure that the direction of rotation of both the sun and the ring gear, be the same. This is important in order to achieve effective power split. It should be noted that many other configurations would be possible by connecting the variable element to any two of the three rotating elements, with and without idler gears, to change the direction of rotation. The configuration shown here is however the easier one that can be directly related to the Automotive CVPST application.

Therefore, according to the present invention, there is provided a continuously variable power split transmission system for use with a first motor power supply and a second motor power supply, the system comprising a planetary gear set comprising a sun gear, a ring gear, a plurality of planet gears and a planet carrier, a sun shaft linked to said sun gear and operatively connected to said first motor power supply, an output shaft operatively connected to said planet carrier, a countershaft operatively connected to said ring gear through a first clutch, said countershaft and said ring gear rotating in the same direction when connected, said countershaft being also operatively connected to said second motor power supply, and said countershaft being also operatively connected to said sun shaft through a speed variator so that said countershaft and said sun shaft rotate in the same direction, whereby power input applied by said first motor power supply to said sun shaft is split into two streams merging on said output shaft through said planet carrier, one stream passing through said speed variator, countershaft and ring gear, the other stream passing directly through said sun gear, and power input applied by said second motor power supply to said countershaft adds power to said ouptput shaft while reducing the power flow required to pass through said speed variator.

BRIEF DESCRIPTION OF THE DRAWINGS

The invention as well as its numerous advantages will be better understood by the following non restrictive description of preferred embodiments made in reference to the appending drawings in which.

DETAILED DESCRIPTION OF THE PREFERRED EMBODIMENTS

Figure 1:
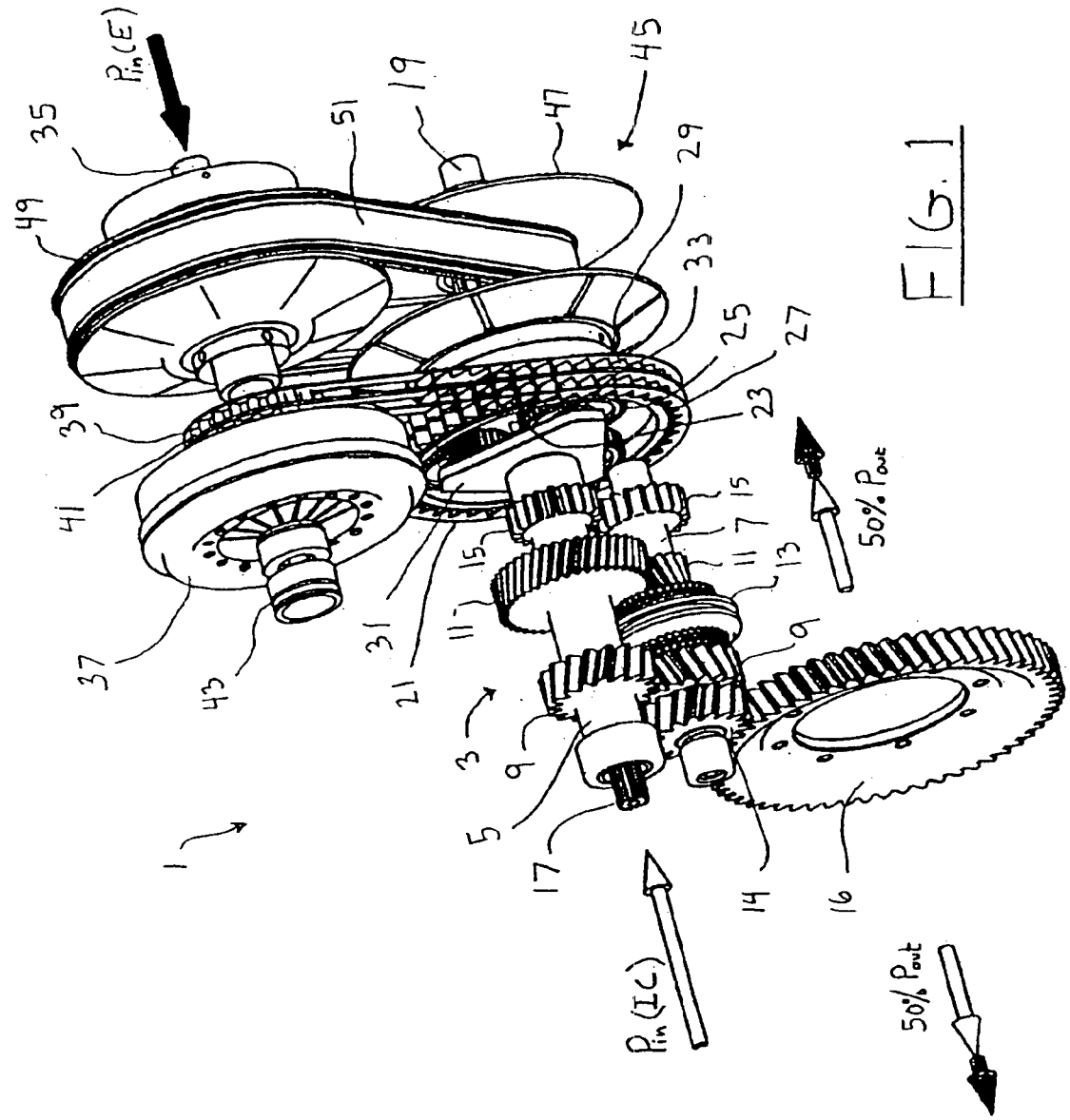
FIG. 1 is a perspective view of main elements of a CVPST system with an in-line step-up gearbox, according to the present invention.
Figure 2:
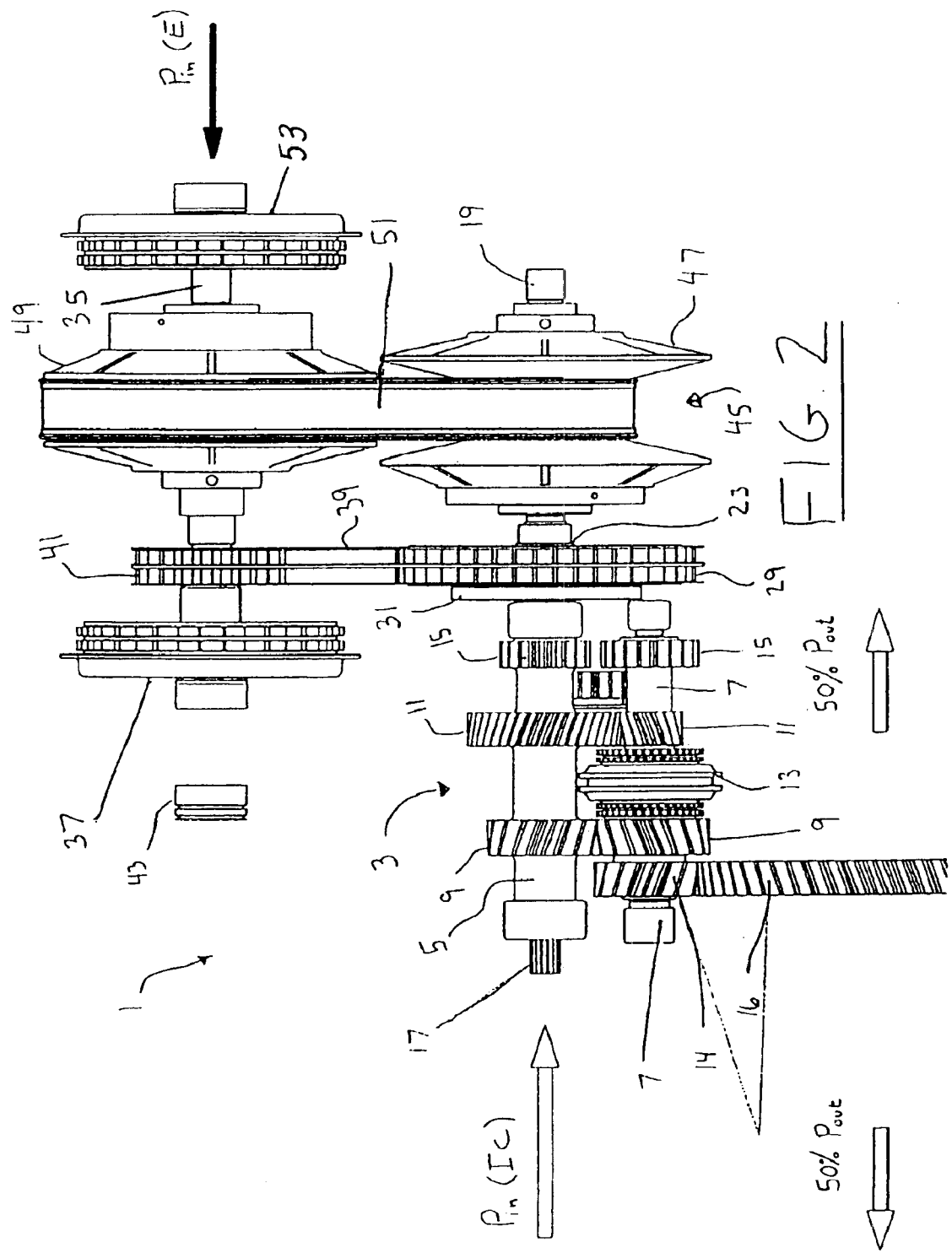
FIG. 2 is a side view of main elements of a CVPST system with an in-line step-up gearbox and a dry multi-disc clutch on a countershaft, according to the present invention.

Referring to FIGS. 1 and 2, there is shown a continuously variable power split transmission (CVPST) system 1 that can be used in a hybrid vehicle having a first motor power supply and a second motor power supply, according to the present invention. For example, the first motor power supply can be an internal combustion (IC) engine and the second motor power supply can be an independent electric motor. However, the first and second motor power supplies may be any types of motors. Furthermore, the second motor power supply may be powered via the first power supply through a differential system.

The CVPST system 1 includes a step-up gearbox 3 which is preferably a conventional two-speed and reverse in-line step-up gearbox having a primary input shaft 5 and a secondary output shaft 7 with first stage ratio gears 9, second stage ratio gears 11, a synchronizer ring 13 and reverse ratio gears 15. As can be seen, some of the gears may have a helical shape for increased performance as is known in the art. Alternatively, a parallel step-up gearbox can also be used instead of an in-line step-up gearbox, to reduce the length of transmission.

The output shaft 7 of the gearbox 3 is connected to a main ratio gear set which is preferably formed of a first gear 14 fixed on the output shaft 7 and a second bigger gear 16 connected to a differential housing (not shown). The differential housing transmits the output power (P.sub.out) to the wheels of the vehicle.

The purpose of the step-up gearbox 3 is to provide additional fixed speed ratios to extend the overall transmission conversion range (CR) of the CVPST system 1.

As shown in FIGS. 1 and 2, the main input power (P.sub.in(IC)) supplied to the CVPST system 1 is provided through a motor shaft 17 that is preferably connected to a internal combustion (IC) engine, or first motor.

The infinitely adjustable, power split variable speed transmission unit used in the CVPST system 1 comprises a sun shaft 19 that is operatively connected to the first motor power supply of the vehicle. In the example shown in FIGS. 1 and 2, the first motor power supply or IC engine is connected to the motor shaft 17 which is keyed on the sun shaft 19.

The infinitely adjustable, power split variable speed transmission unit also comprises a standard planetary gear set 21 having a sun gear 23 fixed to the sun shaft 19. The planetary gear set 21 also comprises two or more planet gears 25 meshed with the sun gear 23, a ring gear 27 meshed with the planet gears 25, a control gear or control sprocket 29 coupled to the ring gear 27, and a planet carrier or spider 31 having planet axes 33 for mounting the planet gears 25. The planet carrier 31 is keyed to the input shaft 5 of the gearbox 3.

The infinitely adjustable, power split variable speed transmission unit also comprises a countershaft 35 extending parallel to the sun shaft 19. The countershaft 35 is operatively connected to the ring gear 27 through a first clutch 37 and an additional control gear with idler (not shown) or an additional control sprocket 41 with silent chain 39, so that the countershaft 35 and ring gear 27 rotate in the same direction. It will be understood by those skilled in the art, that a belt or any other means may be used instead of the chain 39 with control sprockets 29, 41 to achieve the same results.

The countershaft 35 is also operatively connected to the second motor power supply of the vehicle, which is preferably an electric motor (P.sub.in(E)), through a second clutch 53. As mentioned above, the second motor power supply can be any appropriate motor such as a combustion engine, or can even be derived from the first motor power supply through a differential system. However, the latter would not increase the total output power (P.sub.out), it would only decrease the power going through the variator.

Preferably, the control gear or control sprocket 29 is fixed on or integral with the ring gear 27 and the first clutch 37 is mounted on the countershaft 35. The first clutch 37 couples the countershaft 35 with the additional control gear or additional sprocket 41, which is freely mounted on the countershaft 35.

Preferably, the sun shaft 19, which is keyed to the motor shaft 17, is coaxially journalled within the planet carrier 31 and the motor shaft 17 is adapted to extend through the input shaft 5 of the gearbox 3.

The infinitely adjustable, power split variable speed transmission unit further comprises a standard speed variator 45 mounted between the sun shaft 19 and the countershaft 35 to adjustably vary the speed of the countershaft 35. Thereby, the speed and torque of the planet carrier 31 is adjusted through an adjustment of a variator speed ratio i.sub.v.

In the embodiment shown in the accompanying drawings, the speed variator 45 preferably comprises a pair of pulleys 47 and 49 respectively mounted on the sun shaft 19 and countershaft 35 in such a manner as to extend in a same plane perpendicular to the sun shaft and countershaft axes. The pulleys 47 and 49 consist of half-V sheaves on which an endless V-belt 51 is frictionally engaged. Each of the pulleys 47 and 49 has a fixed sheave and a movable sheave for controllably adjusting the distance between the sheaves. This particular arrangement which is known per se allows the belt 51 to change its active radius of contact with the sheaves and thereby vary the rotational speeds of the pulleys with respect to each other, in other words changing the speed ratio of the variator 45, typically from i.sub.v=0.5 to i.sub.v= 2.0. Other mechanisms, such as hydraulic pistons, known per se may also be used to move the half-V sheaves to achieve the same result.

Preferably, the first clutch 37 can be a dry multi-disc clutch activated through a hydraulic piston 43, which allows the variator 45 to run always with the engine, even if the first clutch 37 is disengaged. That prevents the CVPST system 1 to get stuck in the high gear ratio in the event of blocking wheels and stalling engine.

Alternatively, the first clutch 37 may be a multi-disk wet clutch mounted between the ring gear 27 and control gear or control sprocket 29 of the planetary gear set 21.

Figure 3:
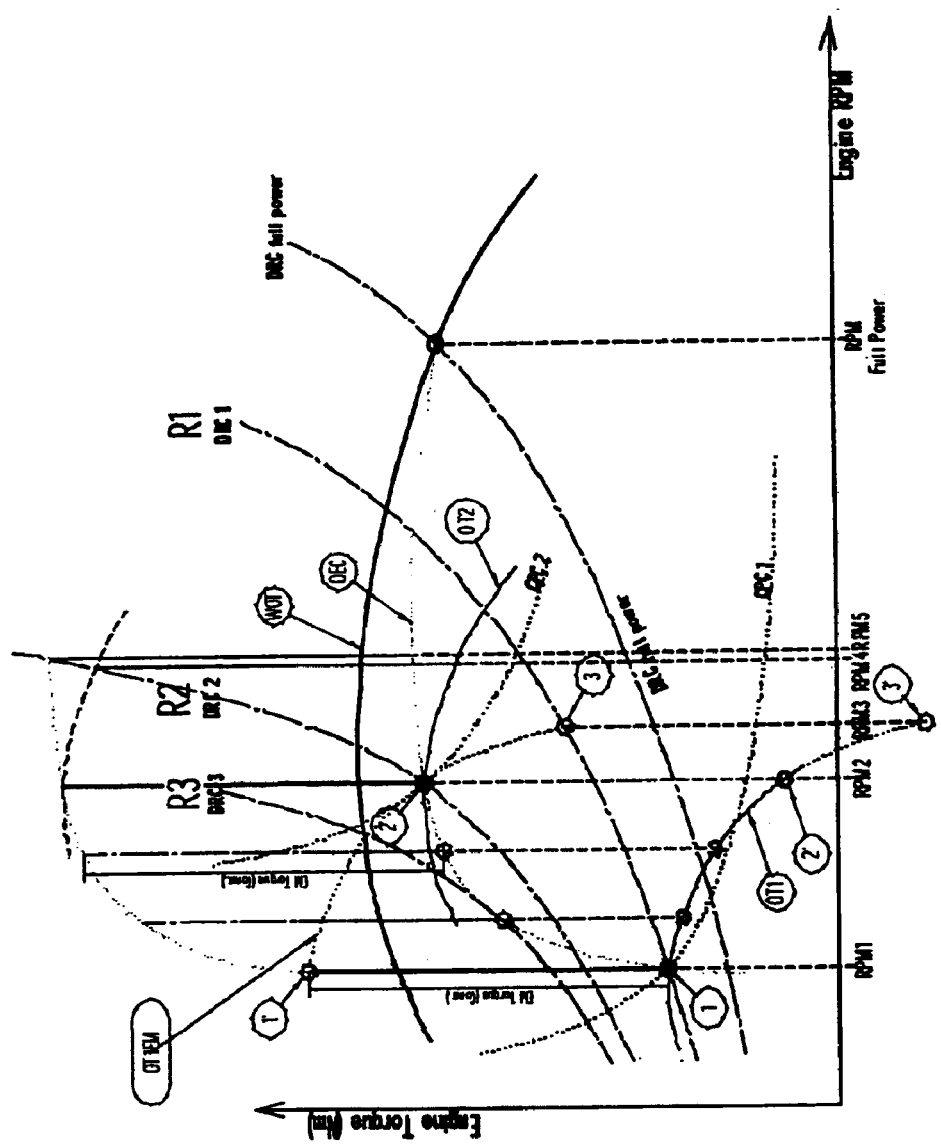
FIG. 3 is a diagram of an engine performance map demonstrating acceleration of a hybrid vehicle with power from IC engine and an electric motor, according to the present invention.

Referring to FIG. 3, an Engine Performance Map (EPM) has been used to illustrate the acceleration of a vehicle where a CVPST is assisted by an electric motor. Such an EPM has shown that proper simultaneous changes in CVPST ratio (R)

and opening of the throttle (OT) permits to achieve an efficient and least polluting acceleration of the vehicle. The acceleration of the vehicle assisted by the electric motor allows the IC engine to work at its optimum conditions, even during transient conditions as long as all excess torque for acceleration comes from electric motor.

It is a very well known fact that during the acceleration of the conventional vehicle (with only IC engine), the working point of the engine can not be kept on Optimum Efficiency Curve (OEC), FIG. 10. Even if during a constant speed movement of the vehicle the engine working point is located on OEC, the additional opening of the throttle is needed to create an excess of torque for acceleration. The engine working point shifts into the area of much higher values of BSFC (Brake Specific Fuel Consumption). New Driving Resistance Curve (DRC) is involved (passing through point 1'), which this time, includes the acceleration resistance of the vehicle at the same transmission ratio (R1).

As the hybrid vehicle starts to accelerate under (lets assume) constant torque (segment 1–1') supplied to the countershaft CVPST, or the output shaft, the opening of the throttle and ratio of the CVPST is incrementally and simultaneously adjusted, so that the working point of the IC engine can stay on the OEC. Opening of the throttle changes incrementally from OT1 position to OT2, and CVPST ratio will also be incrementally adjusted from R1 through R3, and back (in direction of lower ratios) to R2.

Once the IC engine achieves RPM2, throttle position is OT2 and transmission ratio is R2, the new IC engine working point is point 2. At this point the electric power supply is cut off in order to stabilize the new IC engine working point on new Constant Power Curve (CPC2) which intersects the curve OT2 and DRC corresponding to R2. As can be seen from the diagram (FIG. 10) point 2 is also located on the Optimum Efficiency Curve.

This is exactly the expected result. Even during the transient state of IC engine working conditions it is possible to keep the engine working point in the optimum range of BSFC, on OEC. To achieve that however, an Electronic Throttle Control (or Motorized Throttle) is needed, together with automatic adjustment of the transmission ratios. A microprocessor is much better equipped to perform this task than is the driver. The driver will therefore merely control the speed of the vehicle, while the Electronic Throttle Control will adjust throttle and transmission ratio accordingly. Acceleration with CVT-s, if the transmissions are properly controlled, is superior to that with manual transmissions. Although manual step ratio transmissions have slightly superior efficiency, they have a limited possibility to fully explore the Engine Performance Map field.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A continuously variable power split transmission system for use with a first motor power supply and a second motor power supply, the system comprising:
   a planetary gear set comprising a sun gear, a ring gear, a plurality of planet gears and a planet carrier; a SUN shaft linked to said sun gear and operatively connected to said first motor power supply; an output shaft operatively connected to said planet carrier;
   a speed variator;
   a countershaft operatively connected to said ring gear through a first clutch, said counter-shaft and said ring gear rotating in the same direction when connected, said countershaft being also operatively connected to said second motor power supply and said countershaft being also operatively connected to said sun shaft through the speed variator so that said countershaft and said sun shaft rotate in the same direction;
   whereby power input applied by said first motor power supply to said sun shaft is split into two streams merging on said output shaft through said planet carrier, one stream passing through said speed variator, countershaft and ring gear, the other stream passing directly through said sun gear, and power input applied by said second motor power supply to said countershaft adds power to said output shaft while reducing the power flow required to pass through said speed variator.

2. A continuously variable power split transmission system according to claim 1, wherein said output shaft is operatively connected to said planet carrier through an input shaft of a step-up gear box by meshing of a main ratio gear set, whereby said gear box extends the overall transmission range of said system.

3. A continuously variable power split transmission system according to claim 1, wherein said first motor power supply is provided by a combustion engine and said second motor power supply is provided by an electric motor.

4. A continuously variable power split transmission system according to claim 3, wherein said combustion engine provides an optimal torque with respect to a rotation speed thereof to function at an optimum efficiency and said electric motor provides an additional torque needed during acceleration.

5. A continuously variable power split transmission system according to claim 1, wherein said first clutch is mounted to said countershaft and connects said countershaft to said ring gear through a first control gear fixed on said clutch and freely mounted on said countershaft, a second control gear coupled to said ring gear, and a chain operatively connecting said first and second control gears.

6. A continuously variable power split transmission system according to claim 1, wherein said sun shaft is coaxially journalled within said planet carrier, said sun shaft being operatively connected to said first motor power supply through a motor shaft.

7. A continuously variable power split transmission system according to claim 2, wherein said sun shaft is coaxially journalled within said planet carrier, said sun shaft being operatively connected to said first motor power supply through a motor shaft extending through said input shaft of said gearbox.

8. A continuously variable power split transmission system according to claim 1, wherein said speed variator comprises a pair of pulleys respectively mounted onto said sun shaft and said countershaft in such a manner as to extend in the same plane, each of said pulleys having a fixed sheave and a movable sheave, and an endless V-belt mounted onto said pulleys.

9. A continuously variable power split transmission system according to claim 2, wherein said main gear ratio set comprises a first gear fixed on said output shaft and a second gear connected to a differential housing.

10. A continuously variable power split transmission system according to claim 1, wherein said countershaft is operatively connected to said second motor power supply through a second clutch.

* * * * *